(12) United States Patent
Taheri

(10) Patent No.: US 8,070,359 B2
(45) Date of Patent: Dec. 6, 2011

(54) PLASTIC BAG WITH POUR SPOUT AND REINFORCED BOTTOM END

(75) Inventor: Nossi Taheri, Atlanta, GA (US)

(73) Assignee: Thunderbird Global Enterprises, LLC, Atlanta, GA (US)

( * ) Notice: Subject to any disclaimer, the term of this patent is extended or adjusted under 35 U.S.C. 154(b) by 1153 days.

(21) Appl. No.: 11/775,706

(22) Filed: Jul. 10, 2007

(65) Prior Publication Data

US 2008/0285897 A1    Nov. 20, 2008

Related U.S. Application Data

(60) Provisional application No. 60/938,007, filed on May 15, 2007.

(51) Int. Cl.
*B65D 33/16* (2006.01)
*B65D 33/00* (2006.01)
*B65D 33/02* (2006.01)

(52) U.S. Cl. .......... 383/66; 383/207; 383/105; 383/119; 383/906

(58) Field of Classification Search .............. 383/9, 10, 383/63, 66, 906, 35, 105, 119, 207
See application file for complete search history.

(56) References Cited

U.S. PATENT DOCUMENTS

| | | | |
|---|---|---|---|
| 2,684,807 A * | 7/1954 | Gerrish | ........................... 383/206 |
| 3,172,443 A | 3/1965 | Ausnit | |
| 3,181,583 A | 5/1965 | Lingenfelter | |
| 3,226,787 A | 1/1966 | Ausnit | |
| 3,312,339 A | 4/1967 | Million | |
| 3,338,284 A | 8/1967 | Ausnit | |
| 3,385,428 A | 5/1968 | Kugler | |
| 3,402,749 A * | 9/1968 | Kinzler | ........................... 383/10 |
| 3,462,332 A | 8/1969 | Goto | |
| 3,473,589 A | 10/1969 | Gotz | |
| RE26,991 E | 11/1970 | Luca | |
| 3,625,270 A | 12/1971 | Skendzic | |
| 3,679,511 A | 7/1972 | Ausnit | |
| 3,684,156 A | 8/1972 | Fettinger et al. | |
| 3,685,562 A | 8/1972 | Ausnit | |

(Continued)

FOREIGN PATENT DOCUMENTS

DE    3313021 A1 * 10/1984

(Continued)

OTHER PUBLICATIONS

Article by DURAMARK, "Double-pocket specimen bag" (With safe—entry feature), 1996.

(Continued)

*Primary Examiner* — Jes F Pascua
(74) *Attorney, Agent, or Firm* — Parks IP Law LLC; Stephen J. Terrell

(57) ABSTRACT

A plastic bag includes a front wall and a rear wall that are joined together to define a containment portion. To facilitate pouring a pourable substance from the containment portion, the plastic bag includes a pour spout. The pour spout includes an aperture that is defined in a lip. The lip can be formed into a channel such that the pourable substance is directed through the aperture. The plastic bag also includes a series of ribs that are formed in the region where the bag is folded to define a bottom end. The ribs reinforce the bottom end without compromising the flexibility of the bottom end.

9 Claims, 6 Drawing Sheets

U.S. PATENT DOCUMENTS

| | | |
|---|---|---|
| 3,780,781 A | 12/1973 | Uramoto |
| 3,846,209 A | 11/1974 | Howard |
| 3,852,386 A | 12/1974 | Behr |
| 3,889,871 A | 6/1975 | White |
| 3,904,468 A | 9/1975 | Noguchi |
| RE28,959 E | 9/1976 | Naito |
| RE28,969 E | 9/1976 | Naito |
| RE29,208 E | 5/1977 | Naito |
| 4,101,355 A | 7/1978 | Ausnit |
| 4,241,865 A | 12/1980 | Ferrell |
| 4,279,677 A | 7/1981 | Takahashi |
| 4,290,467 A | 9/1981 | Schmidt |
| 4,295,915 A | 10/1981 | Sakaguchi et al. |
| 4,306,924 A | 12/1981 | Kamp |
| 4,428,788 A | 1/1984 | Kamp |
| 4,484,352 A | 11/1984 | Katzin |
| 4,522,678 A | 6/1985 | Zieke |
| 4,555,282 A | 11/1985 | Yano |
| 4,557,384 A | 12/1985 | Membrino |
| 4,572,377 A | 2/1986 | Beckett |
| 4,582,549 A | 4/1986 | Ferrell |
| 4,589,145 A | 5/1986 | Van Erden et al. |
| 4,615,045 A | 9/1986 | Siegel |
| 4,620,320 A | 10/1986 | Sullivan |
| 4,630,311 A | 12/1986 | Bentson |
| 4,654,878 A | 3/1987 | Lems |
| 4,672,723 A | 6/1987 | Hugues et al. |
| 4,682,366 A | 7/1987 | Ausnit et al. |
| 4,699,607 A | 10/1987 | Lambrecht |
| 4,731,911 A | 3/1988 | Gould |
| 4,736,496 A | 4/1988 | Fisher et al. |
| 4,741,789 A | 5/1988 | Zieke et al. |
| 4,744,674 A | 5/1988 | Nocek |
| 4,755,248 A | 7/1988 | Geiger et al. |
| 4,756,629 A | 7/1988 | Tilman et al. |
| 4,811,418 A * | 3/1989 | Reifenhauser .................. 383/10 |
| 4,824,261 A | 4/1989 | Provost |
| 4,835,835 A | 6/1989 | Gould |
| 4,846,585 A | 7/1989 | Boeckmann et al. |
| 4,846,586 A | 7/1989 | Bruno |
| 4,854,017 A | 8/1989 | Kamp |
| 4,863,285 A | 9/1989 | Claxton |
| 4,874,096 A * | 10/1989 | Tessera-Chiesa .................. 383/5 |
| 4,892,414 A | 1/1990 | Ausnit |
| 4,894,975 A | 1/1990 | Ausnit |
| 4,907,321 A | 3/1990 | Williams |
| 4,927,271 A | 5/1990 | Branson |
| 4,930,905 A | 6/1990 | Sharps, Jr. |
| 4,947,525 A | 8/1990 | Van Erden |
| 4,966,470 A | 10/1990 | Thompson et al. |
| 4,985,192 A | 1/1991 | Roeder et al. |
| 4,998,646 A | 3/1991 | Sherman |
| 5,012,561 A | 5/1991 | Porchia et al. |
| 5,022,530 A | 6/1991 | Zieke |
| 5,033,868 A | 7/1991 | Peppiatt |
| RE33,674 E | 8/1991 | Uramoto |
| 5,048,692 A | 9/1991 | Handler et al. |
| 5,053,091 A | 10/1991 | Giljam et al. |
| 5,056,930 A | 10/1991 | Mestetsky |
| 5,063,069 A | 11/1991 | Van Erden et al. |
| 5,066,444 A | 11/1991 | Behr |
| 5,070,584 A | 12/1991 | Dais et al. |
| 5,092,684 A | 3/1992 | Weeks |
| 5,094,707 A | 3/1992 | Bruno |
| 5,100,000 A | 3/1992 | Huseman |
| 5,102,234 A | 4/1992 | Levy |
| 5,118,202 A | 6/1992 | Bruno |
| 5,121,995 A | 6/1992 | Newman et al. |
| 5,152,613 A | 10/1992 | Herrington, Jr. |
| 5,186,543 A | 2/1993 | Cochran |
| 5,192,135 A | 3/1993 | Woods et al. |
| 5,211,481 A | 5/1993 | Tilman |
| 5,259,904 A | 11/1993 | Ausnit |
| RE34,554 E | 3/1994 | Ausnit |
| 5,309,698 A | 5/1994 | Huseman |
| 5,366,294 A | 11/1994 | Wirth et al. |
| 5,372,428 A | 12/1994 | Bruno et al. |
| 5,382,094 A | 1/1995 | Ausnit |
| 5,385,251 A * | 1/1995 | Dunn ........................ 215/11.3 |
| 5,407,277 A | 4/1995 | Burke et al. |
| 5,411,692 A | 5/1995 | Dipietro et al. |
| 5,417,495 A | 5/1995 | Branson |
| 5,419,437 A | 5/1995 | Huseman |
| 5,425,216 A | 6/1995 | Ausnit |
| 5,456,928 A | 10/1995 | Hustad et al. |
| 5,552,202 A | 9/1996 | May |
| 5,624,048 A * | 4/1997 | Sander et al. .................. 215/395 |
| 5,664,303 A | 9/1997 | Johnson |
| 5,749,658 A | 5/1998 | Kettner |
| 5,875,611 A | 3/1999 | Plourde |
| 5,955,160 A | 9/1999 | Tanaka et al. |
| 6,012,844 A | 1/2000 | Huseman et al. |
| 6,020,013 A | 2/2000 | Kozma |
| 6,059,457 A | 5/2000 | Shrehe et al. |
| 6,149,302 A | 11/2000 | Taheri |
| 6,167,597 B1 | 1/2001 | Malin |
| 6,196,716 B1 | 3/2001 | Geyer |
| 6,227,359 B1 | 5/2001 | Truluck |
| 6,273,607 B1 | 8/2001 | Buchman |
| 6,273,609 B1 | 8/2001 | Johnson |
| 6,325,543 B1 | 12/2001 | Ausnit |
| 6,345,911 B1 | 2/2002 | Young et al. |
| 6,360,513 B1 | 3/2002 | Strand et al. |
| 6,361,209 B1 | 3/2002 | LaRue et al. |
| 6,517,242 B1 | 2/2003 | Buchman |
| 6,576,278 B1 | 6/2003 | Sprehe |
| 6,962,439 B2 | 11/2005 | Taheri |
| 7,021,827 B2 * | 4/2006 | Compton et al. ............. 383/205 |
| 2003/0059128 A1 | 3/2003 | Vangedal-Nielsen |
| 2004/0120613 A1* | 6/2004 | Hanson ........................ 383/120 |
| 2005/0185863 A1* | 8/2005 | Carrillo ............................ 383/10 |
| 2005/0276524 A1 | 12/2005 | Taheri |
| 2006/0171611 A1* | 8/2006 | Rapparini ...................... 383/66 |
| 2006/0239594 A1 | 10/2006 | Ishizaki et al. |
| 2006/0280391 A1* | 12/2006 | Buggs ........................... 383/203 |

FOREIGN PATENT DOCUMENTS

| | | |
|---|---|---|
| GB | 2250011 | 5/1992 |
| JP | 38-18345 | 11/1935 |
| JP | 2005138899 A * | 6/2005 |
| JP | 2006298451 A * | 11/2006 |
| JP | 2008001375 A * | 1/2008 |

OTHER PUBLICATIONS

Brochure by ITW MINIGRIP, Inc. for the "minigrip", 1988.
Pak-Sher, "QUICKSAC" Packaging System Featuring Pacene Film.

* cited by examiner

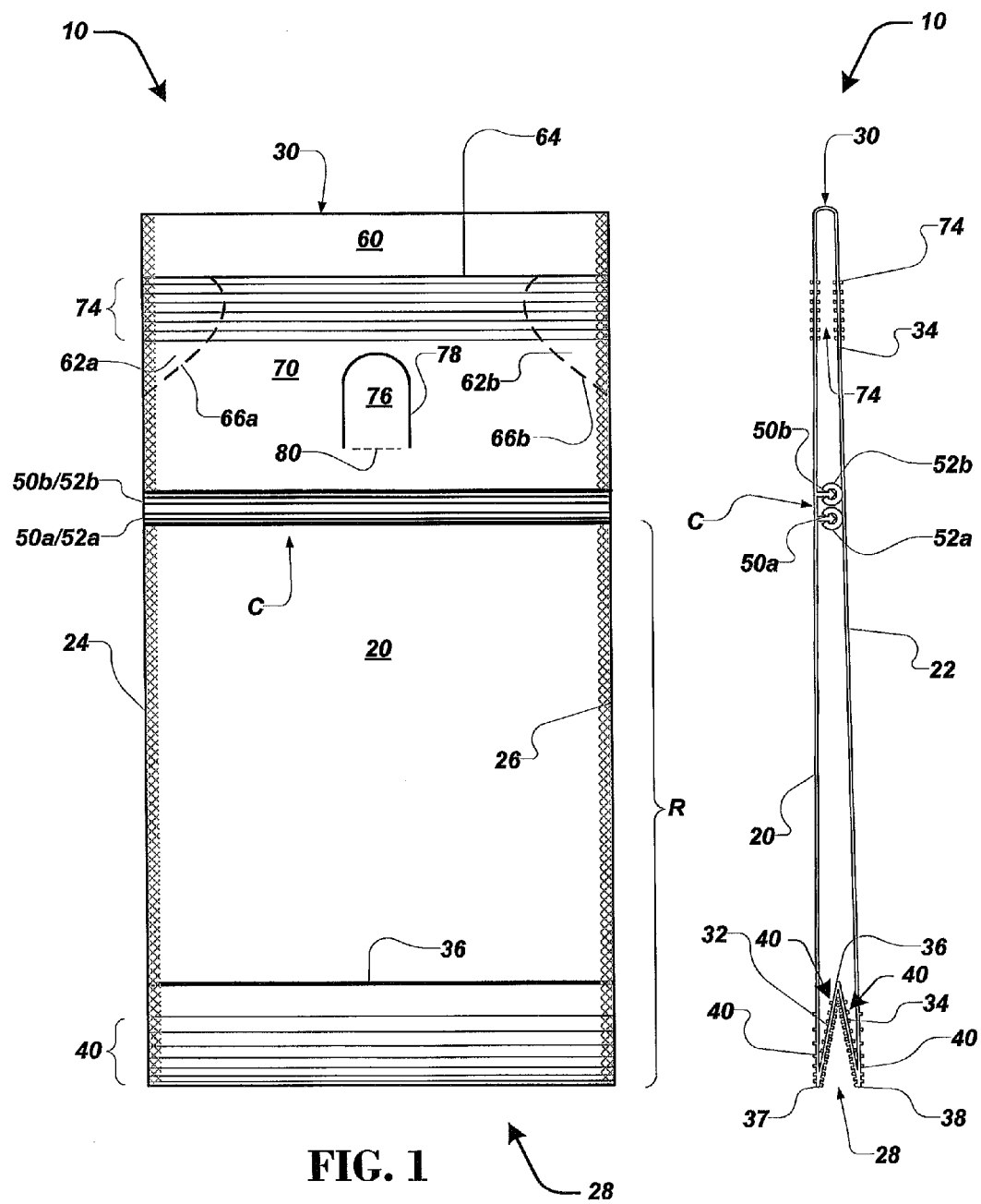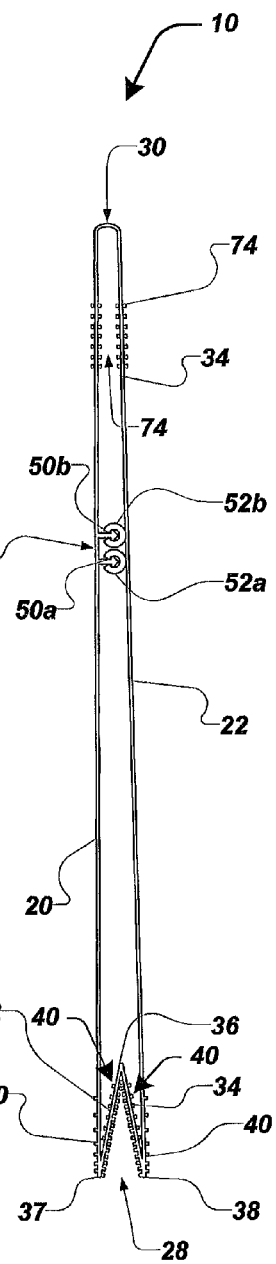
FIG. 1
FIG. 2

PLASTIC BAG WITH POUR SPOUT AND REINFORCED BOTTOM END

RELATED APPLICATIONS

This application claims priority to U.S. Provisional Application No. 60/938,007, filed May 15, 2007, the entirety of which is herein incorporated by reference.

TECHNICAL FIELD

The present invention relates generally to containers and more specifically to plastic bags capable of containing a pourable substance.

BACKGROUND OF THE INVENTION

Plastic bags are used for many purposes, including transporting and storing pourable substances. In many applications, reclosable bags are preferred because they can be closed to seal pourable substances or other contents within, and subsequently repeatedly opened and closed as desired. Typically, the plastic bags are made reclosable by means of a matingly engageable zipper-like releasably locking closure.

The general principles for making plastic bags are fairly well-known and are typified in numerous prior patents. A method of manufacturing the plastic bags includes extruding molten material through an annular opening of a die assembly to produce a tubular film that is later flattened, sealed, and cut into individual bags. The annular opening of the die assembly typically includes profile openings to provide male and female profiles that are integral to the tubular film. However, the profile openings make the annular opening asymmetrical. Material moves more easily through the regions of the annular opening near the profile openings to the detriment of the regions of the annular opening that are distanced from the profile openings. The impact is greatest at the region of the annular opening through which the tubular film that forms the bottom end of the bag is extruded. Accordingly, the bottom end of the bag can have a thickness that is unintentionally thinned and that can easily break or crack, particularly under extreme temperature conditions. Simply thickening the unintentionally thinned portion by widening the annular opening in the affected region is a potential, although flawed, solution to this problem since increasing the thickness of the tubular film in the affected region can make the tubular film difficult to flatten, fold, or otherwise handle during the process of forming individual bags. In general, it is desirable to control the characteristics of the tubular film, such as thickness, rigidity, and flexibility, without wasting material or negatively impacting the performance of the tubular film.

Another problem with existing plastic bags is that it is difficult to pour a liquid or other pourable substance from the bags. For example, the user may bend a lip of a plastic bag into a V-shaped channel through which the pourable substance can be directed. However, the flimsiness of the film and the length of the cantilevered lip results in the channel collapsing or flexing under the weight of the pourable substance. Thus, the channel formed by the lip is not suitable to control the direction of flow of the pourable substance from the bag.

Therefore, a heretofore unaddressed need exists in the industry to address the aforementioned deficiencies and inadequacies. What is needed is a plastic bag that is less susceptible to cracking and breaking and that has an improved pour feature.

SUMMARY

The various embodiments of the present invention overcome the shortcomings of the prior art by providing a plastic bag with a reinforced, flexible bottom end and a pour spout.

According to an exemplary embodiment, a plastic bag includes front and rear walls that are defined by overlapping portions of an elongated panel. The elongated panel is folded to define a bottom end of the plastic bag and the front wall is connected to the rear wall to define side edges of the plastic bag. The bottom end is reinforced, but remains flexible, as a series of ribs are formed in the elongated panel in the region where the elongated panel is folded to define the bottom end.

In certain embodiments, the ribs in the series of ribs are more closely spaced as the series of ribs approaches the bottom end. In other words, the density of the ribs increases towards the bottom end. In embodiments where the elongated panel is folded such that the bottom end includes a gusset that is disposed between the front wall and the rear wall, the ribs of the series of ribs that are formed in the region of the elongated panel that defines the gusset can be more closely spaced than the ribs of the series of ribs that are formed in the region of the elongated panel that defines the front and rear walls.

According to another embodiment, a plastic bag includes a front wall and a rear wall that are joined together at a bottom end and at side edges to define a containment portion. At top end of the bag, the front wall and the rear wall have top edges that are separable from one another to provide an opening to the containment portion. The bag also includes a pour spout. The pour spout includes an aperture that is defined in one of the front and rear walls and that is spaced apart from a respective one of the top edges.

The plastic bag further includes a first band of increased thickness that extends across the front wall and a second band of increased thickness that extends across the rear wall. A first lip is defined between the first band and the top edge of the front wall and a second lip is defined between the second band and the top edge of the rear wall. The aperture is defined in one of the lips and the first and second bands are bendable to controllably form the one of the lips into a channel such that the aperture is positioned at the bottom of the channel. Ribs formed in the lip can facilitate forming the lip into a channel. Thus, as the pourable material is poured through the channel, the pourable material flows through the aperture and is thereby controllably directed or dispensed. In certain embodiments, the pour spout includes a flap that is hingedly connected along an edge of the aperture. Specifically, the flap is hingedly connected along a fold line that is substantially perpendicular to a direction of flow that is defined by the channel. The flap facilitates additionally directing the pourable material as it flows through the aperture.

The first band can include a first profile of a first closure and the second band can include a second profile of the first closure such that the first profile and the second profile can engage one another to seal a pourable substance in the containing portion. Further, the first band can additionally include a third profile of a second closure and the second band can additionally include a fourth profile of said second closure. Thereby, the first and second closures can seal a pourable substance in the containing portion.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments.

Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

FIG. 1 is a front elevation view of a plastic bag, according to an exemplary embodiment of the present invention.

FIG. 2 is a cross-sectional side elevation view of the plastic bag of FIG. 1.

DETAILED DESCRIPTION OF THE EMBODIMENTS

As required, detailed embodiments of the present invention are disclosed herein. It must be understood that the disclosed embodiments are merely exemplary of the invention that may be embodied in various and alternative forms, and combinations thereof. As used herein, the word exemplary is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 3:
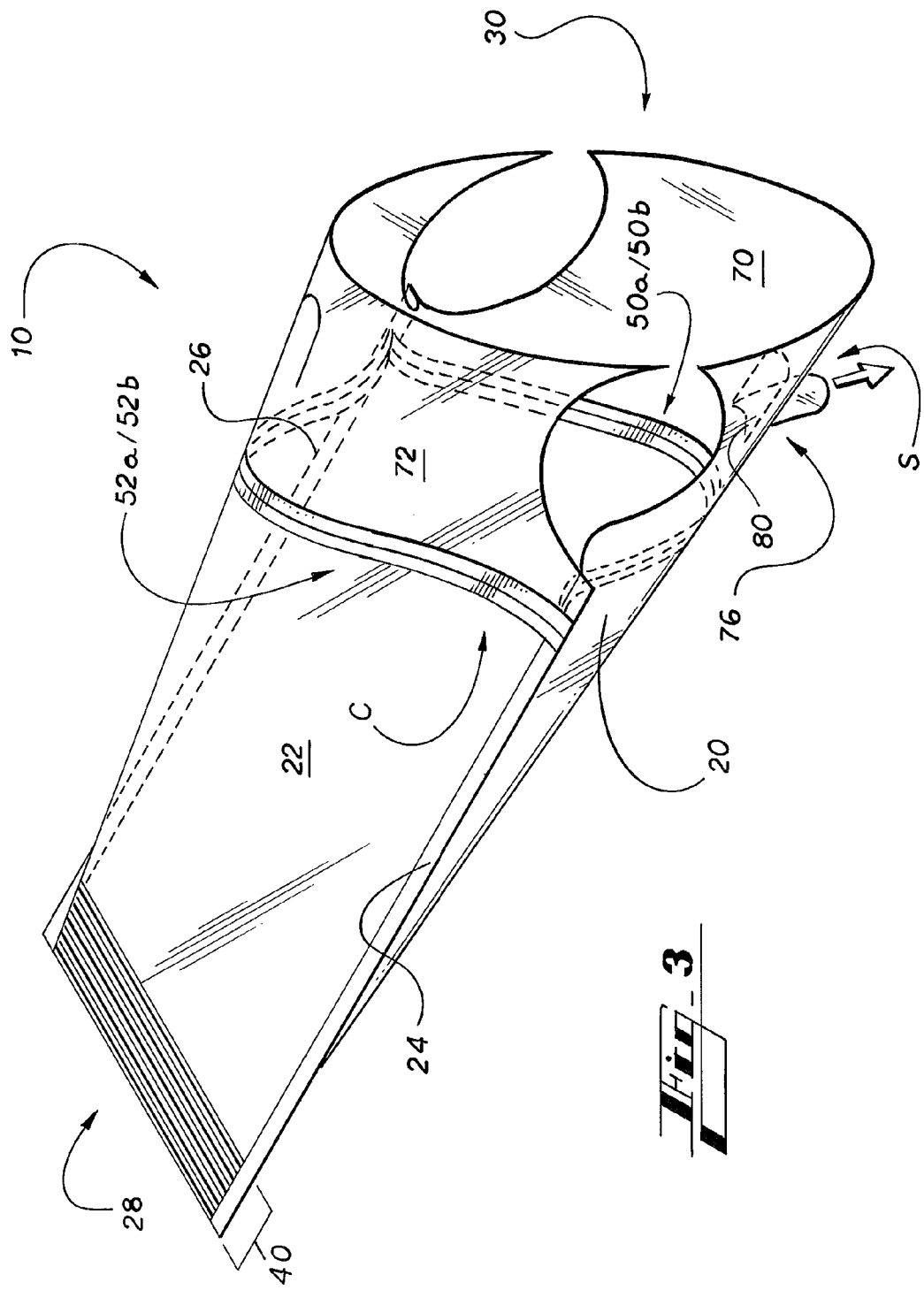
FIG. 3 is a perspective view of the plastic bag of FIG. 1 as it is formed to pour a pourable substance.

Referring to FIGS. 1-3, a plastic bag 10 includes a pouch or interior region, hereinafter referred to as a containment region R, which is capable of containing a pourable substance. The term "pourable substance" refers to liquids, powders, gels, granules, and any other substance that is capable of substantially fluid flow. Use of the term "plastic bag" does not evidence an intent to limit the bag to being made of plastic material. Rather, it is contemplated that other materials that are not categorized as plastics but have similar characteristics can be used to produce bags so as to provide substantially the same advantages as plastic materials. For purposes of teaching and not of limitation, the exemplary embodiments of the invention will be described in the context of a plastic bag for storing, freezing, thawing and dispensing individual servings of mother's milk for infant feedings.

The bag 10 can be produced from materials including, but not limited to, polyethylene (PE), low density polyethylene (LDPE), linear low density polyethylene (LLDPE), polypropylene (PP), ethyl vinyl acetate (EVA), polymers, copolymers, block-copolymers, the like, and blends thereof. As an example, a blend of approximately 10% EVA, approximately 30% LLDPE, and approximately 60% LDPE can be utilized to produce a bag having desirable degrees of pliability, clarity, brittleness, and the like. As an alternative example, a blend of LDPE and LLDPE can likewise be used.

As used herein, the term fold line refers to all manner of lines that define hinge features of the bag, facilitate folding portions of the bag with respect to one another, or otherwise indicate optimal folding locations for the bag. A fold line may include, for example, a perforated line, a scored line, a crimped line, an embossed line, or a debossed line. The term severance line refers to all manner of lines that facilitate separating portions of the bag from one another or that indicate optimal separation locations. Severance lines may include elements such as perforated lines, frangible or otherwise weakened lines, cut lines, or slits.

It should be understood therefore that severance lines and fold lines can each include elements that are formed in the walls of the bag, including perforations, a line of perforations, a line of short slits, a line of half-cuts, a single half-cut, a cut line, an interrupted cut line, slits, scores, any combination thereof, and the like. The elements can be dimensioned and arranged to provide the desired functionality.

The bag 10 includes a front wall 20 and a rear wall 22 that are connected to one another along their sides to define the side edges 24, 26 of the bag 10. The bottom edges of the front and rear walls 20, 22 at least partially define a bottom end 28 of the bag 10. In the exemplary embodiment, the top edges of the front and rear walls 20, 22 are initially connected to one another. As described in further detail below, the top edges of the front and rear walls 20, 22 are separable from one another to provide an opening through which pourable substances can enter and exit the containment region R of the bag 10.

As will be used herein, the term longitudinal relates to the length of the bag 10, which is measured between a top end 30 and the bottom end 28. Likewise, the term transverse relates to the width of the bag 10, which is measured between the side edges 24, 26. These terms will be used to provide descriptions that pertain to alignment or direction of movement of elements with respect to the bag 10.

In an exemplary embodiment, the bottom end 28 is gusseted, which allows the bag 10 to lay flat when empty and to expand when filled. Referring to FIG. 2, the gusseted bottom end 28 includes gusset panels 32, 34 that are disposed between the front and rear walls 20, 22. The first gusset panel 32 is connected along the bottom edge 37 of the front wall 20, the second gusset panel 34 is connected along the bottom edge 38 of the rear wall 22, and the gusset panels 32, 34 are connected to one another along a bottom fold 36. The bottom edges 37, 38 of the front and rear walls 20, 22 move apart when the bag 10 expands. It should be noted that FIG. 3 illustrates an embodiment where an alternative bottom end 28 is provided by a single fold along which the front and rear walls 20, 22 are connected.

It should be understood that, in the exemplary embodiment, the bag 10 is formed from a tubular film that is folded and sealed. Thus, the front wall 20, the rear wall 22, and the gusset panels 32, 34 are formed from a single, initially continuous panel that is folded as described in further detail below. Nevertheless, it is contemplated that the bag 10 may be formed from multiple panels that are heat sealed or otherwise secured to one another.

Referring particularly to FIGS. 1 and 2, the gusset panels 32, 34 and the lower portions of the front and rear walls 20, 22 include ribs 40 that extend transversely between the side edges 24, 26 of the bag 10. Certain of the ribs 40 protrude inwardly and other of the ribs 40 protrude outwardly. Generally described, the ribs 40 are included in the region of the bag 10 that forms the bottom end 28 to reinforce this region without compromising the foldability or flexibility of this region. In this manner, the bag 10 is made more resistant to stress cracking caused, for example, by the mechanical stress imparted in the process of extruding the film or in freezing the contents of the bag 10 in later use.

The ribs 40 are spaced apart from one another by selected distances. It should be understood that increasing the density of placement of the ribs 40 by decreasing the distance therebetween or by increasing the height thereof functions to increase the strength of that region of the bag 10. Thus, a series of ribs 40 can be spaced apart at different distances and/or can have various heights in order to control the strength and maintain consistent thickness of certain regions of the bag 10. The positions of the ribs 40 are discussed in further detail below as they relate to the extrusion of tubular film through an annular opening of a die.

The bag 10 includes a closure band C that is positioned between the bottom end 28 and the top end 30 and that extends transversely between the side edges 24, 26. When the closure band C is closed, the closure band C provides a hermetic seal to prevent entry of contaminants into the containment region R of the bag 10 and/or to prevent leaking of a pourable substance from the containment region R of the bag 10. The closure band C can be integrally formed with or subsequently attached to the walls 20, 22 of the bag 10. Attachment means include, but are not limited to, heat sealing, fusion or welding, adhesive attachment, any combination thereof, and the like.

In alternative embodiments, the closure band does not necessarily provide a closure but rather includes first and second bands of increased thickness that extend across the front and rear walls, respectively, to facilitate controlling the form of the bag 10, as described in further detail below.

In the exemplary embodiment, the closure band C includes a pair of extruded zipper-type closures having elements that are integral to the walls of the bag 10. Each zipper-type closure includes a male profile 50*a*, 50*b* that is integral to the front wall 20 and a female profile 52*a*, 52*b* that is integral to the rear wall 22. The male profiles 50*a*, 50*b* and the corresponding female profiles 52*a*, 52*b* are capable of releasably engaging one another to close the opening of the bag 10 so as to seal a pourable substance in the containment region R.

As shown herein, the exemplary zipper-type closures are arranged and oriented parallel to one another, separated by a gap of about 1 inch. Using such an arrangement is beneficial in several ways. The proximity of the closures allows the user to seal both by simply pinching along the closure band C. A vacuum is created between the closures, which discourages leaking. Furthermore, if one closure fails, the secondary closure can yet contain the contents. The closure band C also is substantially wide and rigid so as to be useful in engaging the bag 10 to form a channel and pour spout S, as described in further detail below. To apprise the user of the ability to close both closures simultaneously or otherwise of the location of the closure band C, indicia such as a wide band of color or printed directions can be applied in the region of the closure band C.

In alternative embodiments, the closure band C can include other types of releasable closures such as releasable adhesive strips or non-releasable closures such as permanent adhesive. Further, in alternative embodiments, one or both of the zipper-type closures can be non-releasable.

Referring to FIG. 2, one of the zipper-type closures is described in further detail although the description is generally applicable to the other of the closures. The male profile 50*a* is a barbed protuberance that is dimensioned to be matingly received by the female profile 52*a*, which is a pair of hook-shaped arms that define a groove. The hook-shaped arms engage the barbed protuberance to releasably interlock the male and female profiles 50*a*, 52*a*. The interlocking engagement is designed to resist inadvertent separation of the male and female profiles 50*a*, 52*a*, for example, due the pressures created by the contents of the bag 10. However, the strength and configuration of the interlocking engagement is designed such that the male and female profiles 50*a*, 52*a* can be intentionally separated from one another, as described in further detail below.

It should be understood that the male profile 50*a* can be alternatively attached to the rear wall 22 and the female element 52*a* can be alternatively attached to the front wall 20. Further, in the exemplary embodiment, the bag 10 includes a pair zipper-type of closure features, although in alternative embodiments the bag can include one or a plurality of zipper-type closure features.

In the exemplary embodiments, the top edges of the front and rear walls 20, 22 are initially connected for purposes of providing tamper evidence. Further, the sides of the front and rear walls 20, 22 are continuously connected along the length of the side edges 24, 26. Referring to FIG. 1, the top end 30 of the bag 10 includes separate detachable portions 60, 62*a*, 62*b* that are removable. The detachable top portion 60 is defined by a severance line 64 and is removable to provide access to the interior of the bag 10. The detachable side portions 62*a*, 62*b* are defined by severance lines 66*a*, 66*b*, and are optionally removable, for example, to facilitate pulling the lips 70, 72 apart to open the closure band C.

Figure 7:
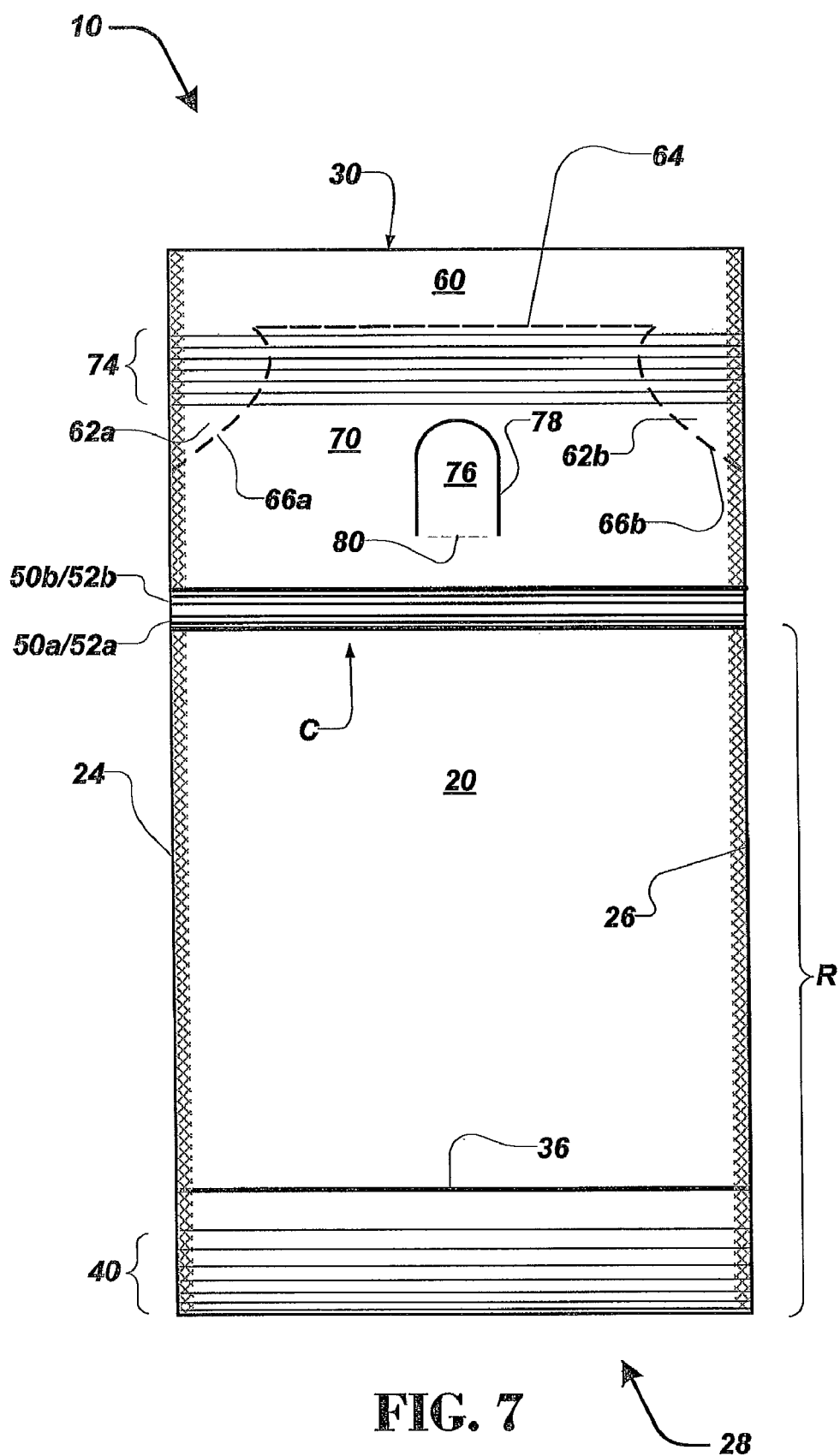
FIG. 7 is a front elevation view of a plastic bag, according to another alternative embodiment of the present invention.

Referring momentarily to an alternative embodiment illustrated in FIG. 7, the severance line 64 does not extend to the side edges 24, 26. Rather, each of the ends of the severance line 64 meets an end of one of the severance lines 66*a*, 66*b* to provide a severance line 64/66*a*/66*b* that defines a detachable portion 60/62*a*/62*b*. The detachable portion 60/62*a*/62*b* can be removed along the severance line 64/66*a*/66*b*. Since the detachable portion 60/62*a*/62*b* is removed as a single piece, rather than in multiple pieces, the detachable portion 60/62*a*/62*b* facilitates easily opening the bag 10 and separating the lips 70, 72 from one another along the top and side edges thereof.

The detachable portions 60, 62*a*, 62*b* provide evidence of tampering or potential contamination prior to use of the bag 10. If each of the detachable portions 60, 62*a*, 62*b* remains attached to the bag 10, it is indicative that the bag 10 has not yet been used. In other words, in order to access the containment region R of the bag 10, at least one of the detachable potions 60, 62*a*, 62*b* first must be removed. Once any or all of the detachable portions 60, 62*a*, 62*b* have been removed, it is indicative that the bag 10 may have been used.

Figure 6:
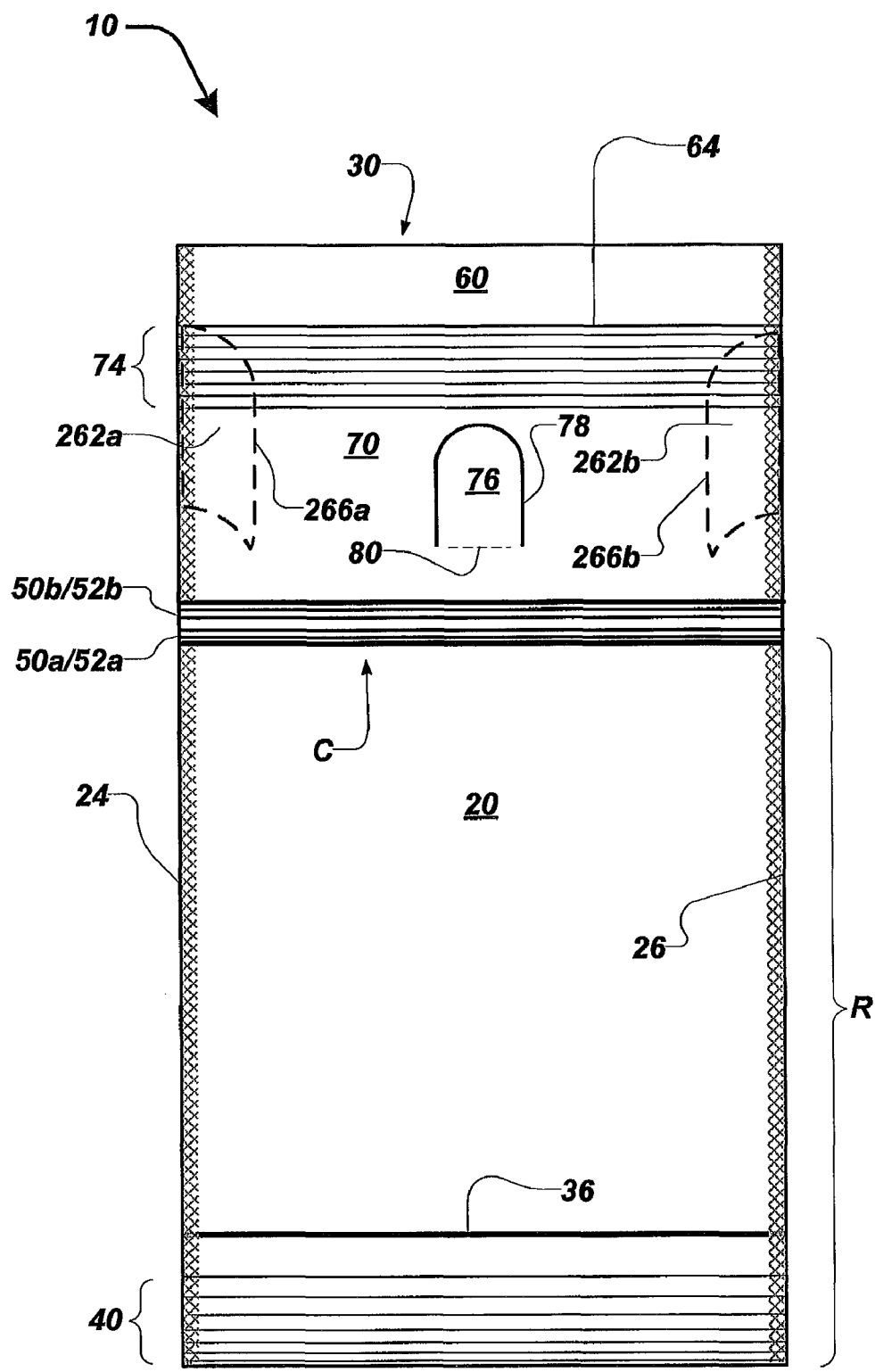
FIG. 6 is a front elevation view of a plastic bag, according to an alternative embodiment of the present invention.

The lips 70, 72 (best shown in FIG. 3) are generally defined between the closure band C and the top end 30. In the exemplary embodiment, the lips 70, 72 are more specifically defined between the closure band C and the severance lines 64, 66*a*, 66*b* such that the lips 70, 72 are connected to one another by the detachable portions 60, 62*a*, 62*b*. Once the detachable portions 60, 62*a*, 62*b* are removed along the severance lines 64, 66*a*, 66*b*, the lips 70, 72 are liberated along the edges defined by the severance lines 64, 66*a*, 66*b*. The lips 70, 72 remain connected to one another along the lengths of the side edges 24, 26 that extend between the severance lines 66*a*, 66*b* and the closure band C, for example, to prevent damage to the closure band C as the lips 70, 72 are pulled apart. As described in further detail below, the lips 70, 72 are pulled apart to facilitate opening the closure band C. In alternative embodiments not requiring tamper evidence, the severance lines 64, 66*a*, 66*b* can be cut lines such that the detachable portions 60, 62*a*, 62*b* are omitted. Furthermore, as an alternative embodiment shown in FIG. 6 illustrates, alternative detachable portions 262*a*, 262*b* may have shapes that vary from those shown in the embodiment of FIG. 1.

Referring to FIGS. 1 and 2, the lips 70, 72 include ribs 74 that facilitate shaping the lips 70, 72 to pour a pourable substance from the bag 10, as described in further detail below. The bag 10 includes both ribs 74 that protrude inwardly and ribs 74 that protrude outwardly to increase the rigidity and stability of the lips 70, 72. For clarity, the ribs 74 are not illustrated in FIG. 3.

It should be understood that the bag 10 can include both ribs 40, 74 that protrude inwardly and ribs 40, 74 that protrude outwardly. In alternative embodiments, certain regions of the bag include ribs that protrude only inwardly or outwardly.

The lips 70, 72 include a pour spout S that facilitates pouring a pourable substance from the bag 10. In the embodiment of FIGS. 1-3, the pour spout S is a flap 76 that is struck from and hingedly connected to the lip 70. It is contemplated that a pour spout S can be provided in either or both of the lips 70, 72. However, for clarity, a single flap 76 is described. The flap 76 is separated or separable from the lip 70 along a severance line 78 and remains hingedly connected to the lip 70 along a fold line 80. The flap 76 is substantially longitudinally aligned and the fold line 80 is substantially transversely aligned. The proximal end of the flap 76, which is hingedly connected to the lip 70, is nearer the closure band C and the distal end of the flap 76 is nearer the distal end of the lip 70. The fold line 80 is offset from the closure band C by a selected distance such that the relatively rigid closure band C can aid in the formation of a channel from the lip 70. The flap 76 functions to direct a pourable substance from the channel through the opening in the lip 70, as described in further detail below. When the lip 70 is not formed as a channel, the flap 76 provides a splash guard or otherwise closes the opening in the lip 70 as the bag 10 is being filled.

In other embodiments, the pour spout S additionally or alternatively can include one or more apertures, flaps, slots, combinations thereof, and the like. For example, in alternative embodiments, a severance line can be substituted for the fold line 80 such that the flap 76 is struck from or detachable from the lip 70 to define an aperture.

In embodiments where the flap 76 remains hingedly connected to the lip 70 along the fold line 80, the flap 76 can alternatively be formed in the shape of a triangle, a semicircle, a rectangle with squared corners, or any other shape that is suitable for directing the flow of pourable material as described herein.

If desired, various parts of the bag can be identified with different colors. For instance, the male profile 50a could be made as a blue strip, while the female profile 52a could be identified by a red strip. Further, it is also contemplated that any portion of the bag could contain indicia, such as a printed or embossed design. If situated on the lips 70, 72, the indicia could indicate the location of the detachable portions 60, 62a, 62b. Provision of indicia of an intricate, regular pattern, such as a bulls-eye pattern or cross-hatching, will more readily indicate tampering. As shown in FIG. 1, additional indicia could include quantity markings, identification markings, and the like.

The bag 10 can be filled for the first time as described by the following method. The detachable portions 60, 62a, 62b are removed from the bag 10 along the severance lines 64, 66a, 66b and the lips 70, 72 are pulled apart to the extent that the male profiles 50a, 50b are separated from the female profiles 52a, 52b to open the closure band C. When the closure band C is open, access is provided to the containment region R of the bag 10. A pourable substance (e.g., breast milk) is thereafter deposited into the containment region R of the bag 10 through the opening and the zipper-type closure band C is closed to seal the contents therein. Once contents are placed in the bag 10, the gusseted bottom end 28 can expand such that the bag 10 is rendered freestanding.

Referring again to FIG. 3, according to an exemplary method of pouring a pourable substance from the bag 10, the lips 70, 72 are pulled apart to open the closure band C. The bag 10 is then configured to define a U-shaped or V-shaped channel of flow that longitudinally aligns with the flap 76. Specifically, the side edges 24, 26 are pinched inwardly at the closure band C such that the front and rear walls 20, 22, and specifically the lips 70, 72, are bowed. It should be noted that the ribs 74 (shown in FIGS. 1 and 2) increase the ability to control the shape of the lip 70.

To pour the pourable substance through the channel provided by the bowed front wall 20 and lip 70, the bag 10 is tipped such that the top end 30 is vertically lower than the bottom end 28. As the pourable substance moves out of the containment region, past the closure band C, and onto the lip 70, the pourable substance encounters the flap 76, which is positioned at the bottom of the channel. The weight of the pourable substance pushes the flap 76 outwardly such that the pourable substance exits the channel through an opening in the lip 70 defined by the flap 76. The flap 76 directs the pourable substance along its length and off its distal end and thereby facilitates controlling the direction of flow of the pourable substance, for example, into another container.

As mentioned above, the closure band C includes a pair of closures 50a/52a, 50b/52b that are spaced apart but are relatively closely aligned with one another. The proximity of the closures 50a/52a, 50b/52b yields a closure band C that imparts rigidity to facilitate controlling the shape of the channel.

It should be noted that the closure band C has less influence on the shape of the channel with increased distance from the closure band C. For example, the integrity of the channel is lessened near the distal ends of the lips 70, 72. However, the pour spout S is positioned nearer to the closure band C to be able to controllably pour a pourable substance using the pour spout S.

Figure 4:
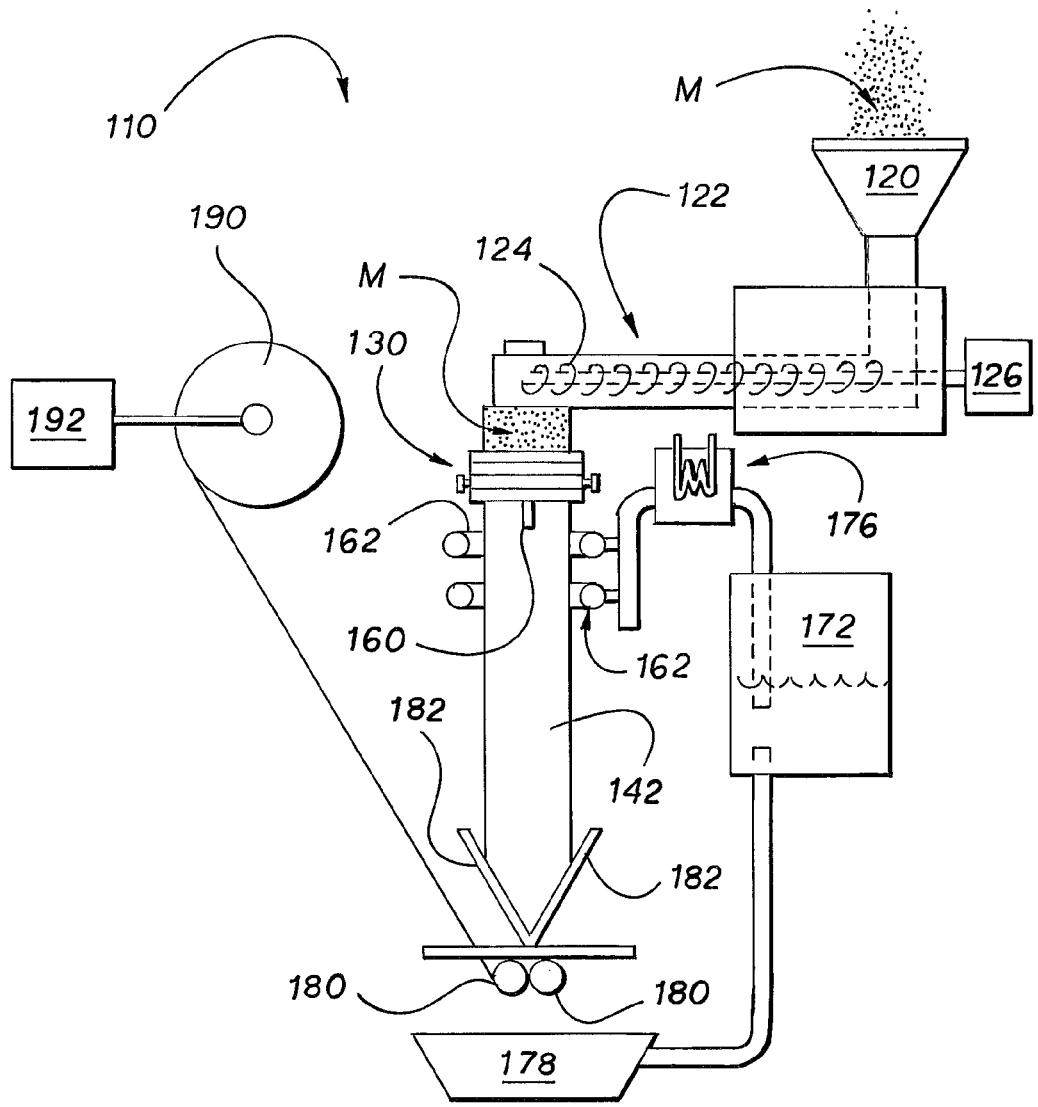
FIG. 4 is a schematic view of an apparatus for producing tubular film.

An exemplary method of making the bag 10 is now described. Referring to FIG. 4, an apparatus 110 for processing material M is described. The apparatus 110 includes a hopper 120 for receiving material M, which may be initially in pellet form when it is received in the hopper 120. The hopper 120 guides the material M into an upstream end of an extruder or heated cylinder 122 in which a screw 124 is disposed. The material M is melted in the heated cylinder 122 and moved through the heated cylinder 122 by the screw 124, which is driven by an electric motor 126.

Figure 5:
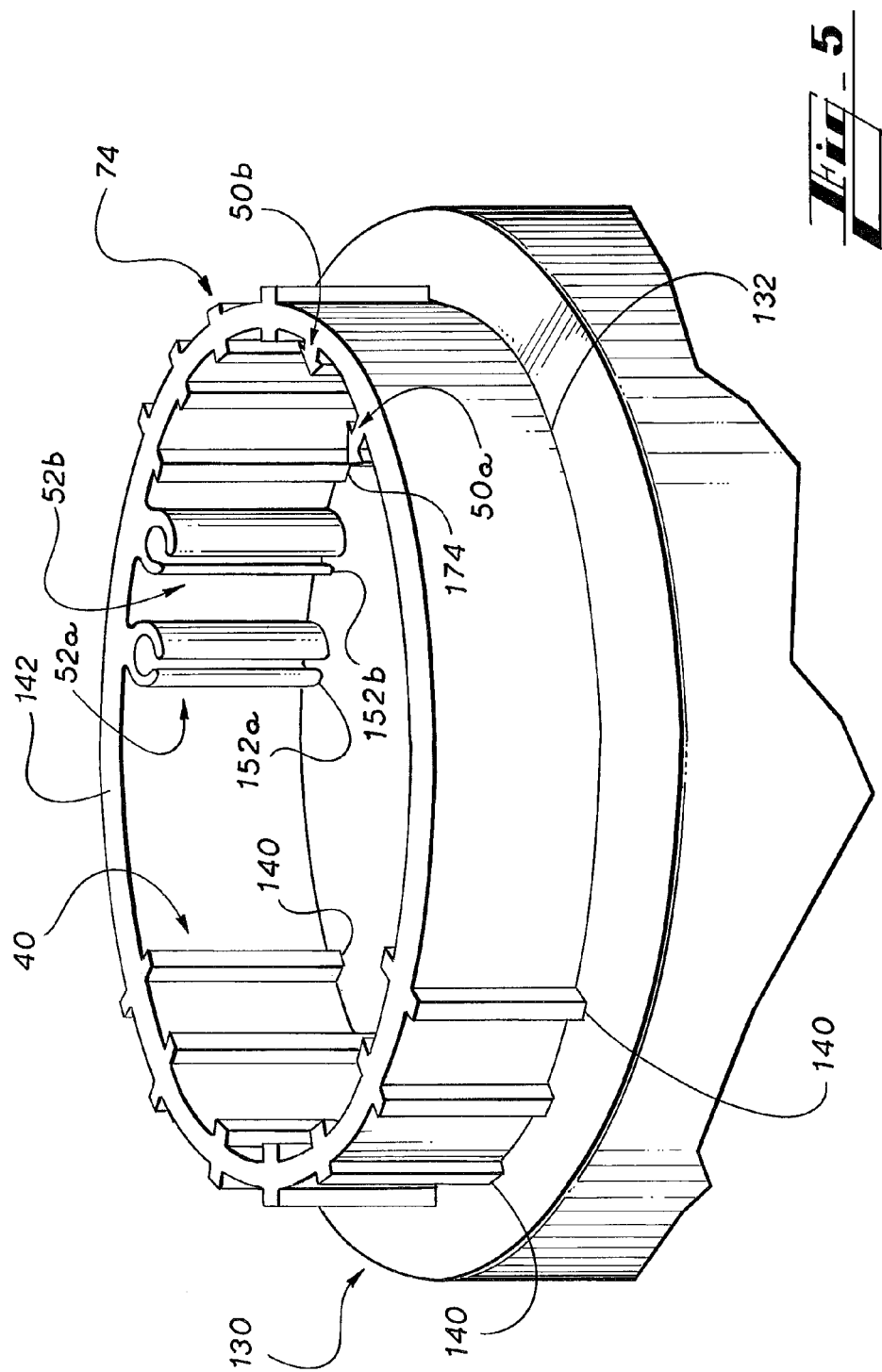
FIG. 5 is a perspective view of a die of the apparatus of FIG. 4 and of tubular film having been extruded through the die.

A die 130 is disposed at the downstream end of the heated cylinder 122. As shown in FIG. 5, the die 130 includes an annular opening 132 through which the molten material M is extruded. The annular opening 132 includes zipper-type closure profile openings 150a, 150b (obstructed) and 152a, 152b that project radially inwardly and a rib profile openings 140, 174 that project inwardly and outwardly. The rib profile openings 140 are located substantially opposite or away from the closure profile openings 150a, 150b, 152a, 152b and are increasingly spaced apart as the rib profile openings 140 approach the closure profile openings 150a, 150b, 152a, 152b. In general, the rib profile openings 140 are positioned to balance the flow of material M through the annular opening 132.

Since the closure profile openings 150a, 150b, 152a, 152b are integral to the annular opening 132, the molten material M would flow relatively more easily through this widened portion of the annular opening 132 and relatively less easily through the remainder of the annular opening 132 were the rib profile opening 140 absent. This is particularly true of regions of the tubular film 142 that are formed by portions of the annular opening 132 that are furthest away from the closure profile openings 150a, 150b, 152a, 152b, such as the region of the tubular film 142 that defines the bottom end 28 of the bag 10. Thus, absent the rib profile openings 140, the thickness of the bottom end 28 of the bag 10 is less than the other regions of the bag 10 and the bottom end 28 would be prone to breaking or cracking, especially under extreme low temperatures.

However, since the rib profile openings 140 are integral to the annular opening 132 and are disposed opposite the closure profile openings 150a, 150b, 152a, 152b, the rib profile openings 140 widen an otherwise narrower portion of the annular opening 132 to better balance the flow of molten material M through the annular opening 132. In the illustrated embodiment, the rib profile openings 140 increase in density at distances that are further from the closure profile openings 150a, 150b, 152a, 152b. The molten material M moves through the annular opening 132 in a more distributed manner and the portion of the tubular film 142 that is extruded through and adjacent to the rib profile openings 140 has an increased thickness. It should be understood that the profile openings can be alternatively arranged and profile openings can be omitted or added.

The molten material M is extruded through the annular opening 132 in the die 130 to produce the tubular film 142, which includes zipper-type male and female closure profiles 50a, 50b, 52a, 52b and ribs 40, 74. To prevent the tubular film 142 from collapsing or to maintain the tubular film 142 in the extruded tubular shape, the interior of the tubular film 142 is pressurized. The air pressure at the interior of the tubular film 142 is supplied by a controlled air pressure line 160, which extends through an opening in the die 130.

In alternative embodiments, the air pressure is controlled to expand the tubular film 142. The ratio of the dimension of the tubular film 142 to that of the annular opening 132 is termed the blow up ratio. Generally, a blow up ratio of one to one is used to maintain the integrity of the zipper-type closure profiles 50a, 50b, 52a, 52b and ribs 40, 74 as well as the thickness of the tubular film 142. According to the exemplary method, extrusion will be performed without enlarging or stretching the tubular film 142 and the supplied air pressure within the tubular film 142 will be sufficient to maintain the walls of the tubular film 142 in cylindrical form without expanding them.

Referring to FIG. 4, once the tubular film 142 is extruded through the die 130, the tubular film 142 is cooled according to an exemplary method in order to achieve optimal amounts of clarity and strength. Specifically, the tubular film 142 is cooled as quickly as possible to achieve a high degree of clarity. The entire circumference of the outer surface of the tubular film 142 is cooled.

In general, some cooling is imparted by the air within the tubular film 142, although the principal heat removal is by means of rings of water jets 162 that circumferentially surround and are coaxial with the tubular film 142 as it leaves the annular opening 132. The water jets 162 direct a flow or spray of water (or other cooling fluid), which is temperature controlled at a cooling temperature, to the tubular film 142 in a uniform manner in order to uniformly remove heat from the tubular film 142.

The apparatus 110 includes a recirculating cooling system that includes a water tank 172 that feeds the water jets 162, a collecting basin 178 that recycles the water coming off the tubular film 142 and returns it to the water tank 172, and a heat exchanger 176 that cools the water to a selected temperature before it reaches the water jets 162.

Controlling the temperature of the material during the process results in a higher quality tubular film 142. For example, the temperature of a film consisting of a blend of 95% LDPE and 5% LLDPE as it is extruded through the die 130 commonly ranges from 150° C. (302° F.) to 160° C. (320° F.) The heat exchanger 176 cools the water to between approximately 25° C. (77° F.) to 28° C. (82.4° F.) before it reaches the water jets 162. This temperature range represents a water temperature that effectively cools the tubular film 142 to produce the desired properties. Further, this temperature range is achievable for the typical heat exchanger 176. Were the heat exchanger 176 increasingly capable, it would be preferable to operate at a water temperature range of 15° C. (59° F.) to 20° C. (68° F.). Experimental results suggest that controlling the ambient temperature of the environment in which the apparatus 110 is located to be substantially 35° C. (95° F.) can improve the results of the process.

During the process, the die 130 faces downwardly such that the tubular film 142 moves down through the rings of jets 162 that spray the tubular film 142 with water from all directions. It should be understood that the ring of jets 162 has a diameter that is larger than the diameter of the tubular film 142 so as to be spaced apart therefrom.

Once the tubular film 142 passes through the rings of jets 162, a blower (not shown) directs a flow of air to the outside surface of the tubular film 142. The blower (not shown) further cools the tubular film 142 and removes water residue from the tubular film 142. For example, based on experimental results, the temperature of the tubular film can be reduced to 40° C. (104° F.) at this point in the process thereby ensuring that the tubular film 142 is sufficiently solidified.

After the tubular film 142 is sufficiently solidified, the tubular film 142 is channeled downwardly and guided between pinch rollers 180 by guides 182. The pinch rollers 180 flatten the tubular film 142. To eliminate water droplets and moisture from the surface of the tubular film 142, a blower (not shown) directs air to the tubular film 142 as the tubular film 142 travels through the pinch rollers 180. The flattened tubular film 142 is then wound onto a spool 190, which is driven by an electric motor 192.

The apparatus 110 includes a control panel (not shown) with controls that allow an operator to control the rotational speed of each of the electric motors 126, 192, the temperature of the heating element of the heated cylinder 122, and the temperature of heat exchanger 176 of the cooling system. Thus, the draw down rate of the tubular film 142 can be controlled.

Once the tubular film 142 has been rolled onto a spool 190, it can be fed into an apparatus (not shown) that is designed for making bags from the tubular film 142.

The tubular film 142 is inverted or folded to form the bottom end 28 of the bag 10. Specifically, a portion of the bottom end region is pushed inward to create an overlapping fold that defines the gusseted bottom 28. The apparatus can then form heat seals across the width of the tubular film 142, thereby forming the side edges 24, 26 of the bag 10 and securing the folded gusseted bottom end 28. The apparatus perforate the tubular film 142 to define the severance line 64 and can punch or strike the tubular film 142 to define the severance lines 66a, 66b, the severance line 78, and the fold line 80. The heat seals can then be cut with a hot knife to separate the bags 10 from one another.

The law does not require and it is economically prohibitive to illustrate and teach every possible embodiment of the present claims. Hence, the above-described embodiments are merely exemplary illustrations of implementations set forth for a clear understanding of the principles of the invention.

Variations, modifications, and combinations may be made to the above-described embodiments without departing from the scope of the claims. All such variations, modifications, and combinations are included herein by the scope of this disclosure and the following claims.

The invention claimed is:

1. A plastic bag, comprising:
   a front wall and a rear wall that are joined together at a bottom end and at side edges to define a containment portion;
   a top end where said front wall and said rear wall have top edges that are separable from one another to provide an opening to said containment portion;
   a pour spout comprising an aperture that is defined in one of said front and rear walls, said aperture being spaced apart from a respective one of said top edges;
   a first band of increased thickness extending across said front wall and a second band of increased thickness extending across said rear wall;
   a first lip defined between said first band and said top edge of said front wall;
   a second lip defined between said second band and said top edge of said rear wall;
   wherein said aperture is defined in one of said lips and said first and second bands are bendable to controllably form said one of said lips into a channel such that said aperture is positioned at the bottom of said channel; and
   wherein said pour spout further comprises a flap that is hingedly connected along an edge of said aperture.

2. The plastic bag of claim 1, wherein the flap is hingedly connected along a lower edge of said aperture.

3. The plastic bag of claim 1, further comprising a severance line that defines a detachable top portion of the plastic bag, the pour spout being positioned between the severance line and one of said first band of increased thickness and said second band of increased thickness.

4. A plastic bag, comprising:
   a front wall and a rear wall that are joined together at a bottom end and at side edges to define a containment portion;
   a top end where said front wall and said rear wall have top edges that are separable from one another to provide an opening to said containment portion;
   a pour spout comprising an aperture that is defined in one of said front and rear walls, said aperture being spaced apart from a respective one of said top edges, wherein the aperture is elongated along a direction that extends between the bottom end and the top end;
   a first band of increased thickness extending across said front wall and a second band of increased thickness extending across said rear wall;
   a first lip defined between said first band and said top edge of said front wall;
   a second lip defined between said second band and said top edge of said rear wall;
   wherein said aperture is defined in one of said lips and said first and second bands are bendable to controllably form said one of said lips into a channel such that said aperture is positioned at the bottom of said channel; and
   wherein said pour spout further comprises a flap that is hingedly connected along an edge of said aperture.

5. The plastic bag of claim 4, wherein said flap is hingedly connected along a fold line that is substantially perpendicular to a direction of flow that is defined by said channel.

6. The plastic bag of claim 4, wherein the flap is hingedly connected along a lower edge of said aperture.

7. The plastic bag of claim 4, further comprising a severance line that defines a detachable top portion of the plastic bag, the pour spout being positioned between the severance line and one of said first band of increased thickness and said second band of increased thickness.

8. A plastic bag, comprising:
   a front wall and a rear wall that are joined together at a bottom end and at side edges to define a containment portion;
   a top end where said front wall and said rear wall have top edges that are separable from one another to provide an opening to said containment portion;
   a pour spout comprising an aperture that is defined in one of said front and rear walls, said aperture being spaced apart from a respective one of said top edges, wherein the aperture is elongated along a direction that extends between the bottom end and the top end;
   a first band of increased thickness extending across said front wall and a second band of increased thickness extending across said rear wall;
   a first lip defined between said first band and said top edge of said front wall;
   a second lip defined between said second band and said top edge of said rear wall;
   wherein said aperture is defined in one of said lips and said first and second bands are bendable to controllably form said one of said lips into a channel such that said aperture is positioned at the bottom of said channel; and
   said one of said lips further comprising a series of ribs that facilitate forming said one of said lips into said channel.

9. A plastic bag, comprising:
   a front wall and a rear wall that are joined together at a bottom end and at side edges to define a containment portion;
   a top end where said front wall and said rear wall have top edges that are separable from one another to provide an opening to said containment portion;
   a pour spout comprising an aperture that is defined in one of said front and rear walls, said aperture being spaced apart from a respective one of said top edges;
   a first band of increased thickness extending across said front wall and a second band of increased thickness extending across said rear wall;
   a first lip defined between said first band and said top edge of said front wall;
   a second lip defined between said second band and said top edge of said rear wall;
   wherein said aperture is defined in one of said lips and said first and second bands are bendable to controllably form said one of said lips into a channel such that said aperture is positioned at the bottom of said channel; and
   said one of said lips further comprising a series of ribs that facilitate forming said one of said lips into said channel, said series of ribs being substantially parallel to a respective one of said first band and said second band.

* * * * *